United States Patent
Tsuyoshi et al.

(10) Patent No.: US 7,628,097 B2
(45) Date of Patent: Dec. 8, 2009

(54) BOLT-TIGHTENING TOOL

(75) Inventors: Tomoaki Tsuyoshi, Tokyo (JP);
Yasuyuki Tachino, Tokyo (JP); Chihiro Morimoto, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 87 days.

(21) Appl. No.: 11/912,364

(22) PCT Filed: Jan. 25, 2007

(86) PCT No.: PCT/JP2007/051649

§ 371 (c)(1),
(2), (4) Date: Oct. 23, 2007

(87) PCT Pub. No.: WO2007/097166

PCT Pub. Date: Aug. 30, 2007

(65) Prior Publication Data

US 2009/0064824 A1    Mar. 12, 2009

(30) Foreign Application Priority Data

Feb. 20, 2006 (JP) .............................. 2006-042946

(51) Int. Cl.
*B25B 21/00* (2006.01)
*B25B 23/02* (2006.01)

(52) U.S. Cl. ........................................ 81/57.22; 81/467
(58) Field of Classification Search ................ 81/57.22, 81/57.36, 54, 57.31, 467, 469
See application file for complete search history.

(56) References Cited

U.S. PATENT DOCUMENTS

| | | | | |
|---|---|---|---|---|
| 2,069,882 | A * | 2/1937 | Hall | 81/467 |
| 2,964,152 | A * | 12/1960 | Banner | 192/56.32 |
| 3,757,613 | A * | 9/1973 | Arndt et al. | 81/57.22 |
| 3,805,645 | A * | 4/1974 | Jenny | 81/476 |
| 6,105,475 | A * | 8/2000 | Ohmi et al. | 81/469 |
| 6,196,089 | B1 * | 3/2001 | Choi | 81/57.36 |
| 6,834,567 | B2 * | 12/2004 | Rosetto | 81/57.22 |
| 2006/0169107 | A1 * | 8/2006 | Taniguchi et al. | 81/57.22 |

FOREIGN PATENT DOCUMENTS

JP    61-169534    10/1986

* cited by examiner

*Primary Examiner*—David B Thomas
(74) *Attorney, Agent, or Firm*—Rankin, Hill & Clark LLP (57) ABSTRACT

A bolt-tightening tool for tightening two bolts at the same time. The bolt-tightening tool includes a first rotating shaft coupled with a motor shaft and a second rotating shaft coupled with a motor case. A first bolt is tightened with the first rotating shaft, while a second bolt is tightened with the second rotating shaft, whereby the first and the second bolts are tightened with a same amount of torque.

8 Claims, 8 Drawing Sheets

BOLT-TIGHTENING TOOL

TECHNICAL FIELD

The present invention relates to a bolt-tightening tool that can tighten two bolts by using a single motor as a drive source.

BACKGROUND ART

A regular nut runner tightens one bolt with one drive source. However, tightening efficiency would be improved if it were possible to tighten multiple bolts at the same time with one drive source. In view of this, a two-nut runner is proposed in Japanese Utility Model Laid-Open Publication No. 61-169534. This two-nut runner is described hereinbelow with reference to FIG. 10 hereof.

Figure 10:
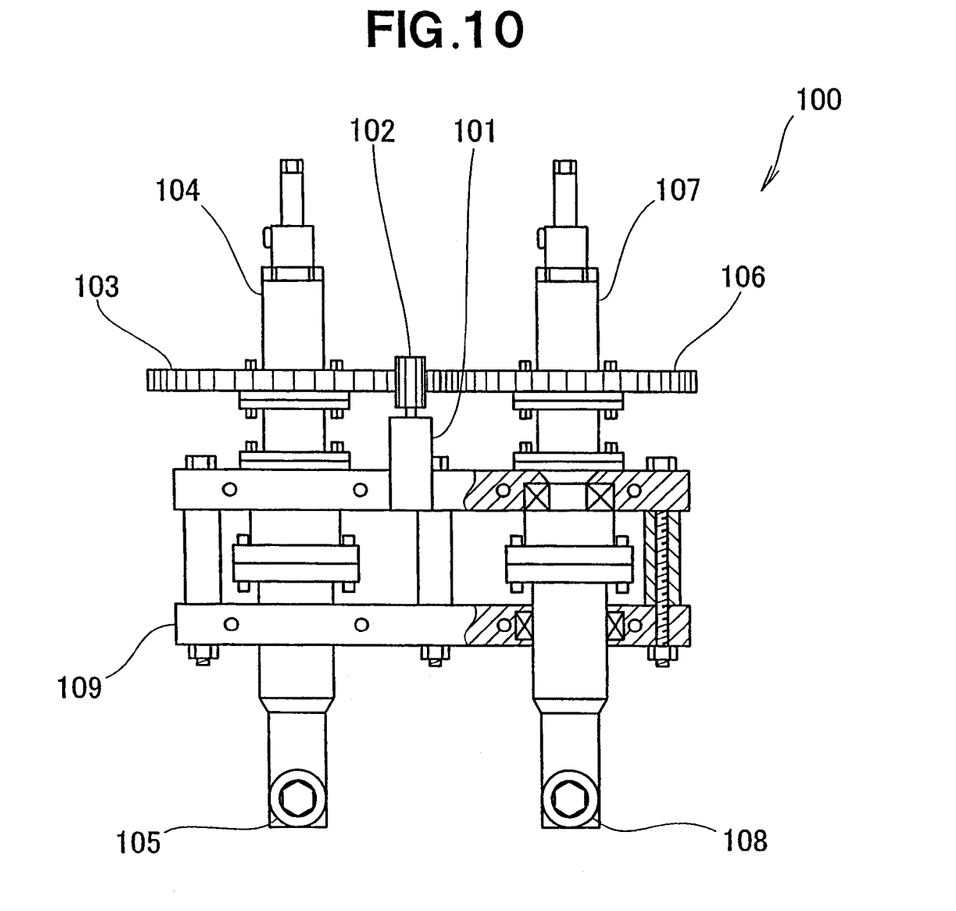
FIG. 10 is a schematic view illustrating the basic configuration of a main part of a conventional two-nut runner.

The two-nut runner 100 shown in FIG. 10 is composed of a motor 101 as a drive source, a drive gear 102 mounted at the end of the output shaft of the motor 101, a first driven gear 103 fitted with the drive gear 102, a first nut runner 104 driven by the first driven gear 103, a first socket 105 mounted at the lower end of the first nut runner 104 to face towards the surface of the diagram, a second driven gear 106 fitted with the first driven gear 103, a second nut runner 107 that is driven by the second driven gear 106 and that is provided in parallel with the first nut runner 104, a second socket 108 mounted at the lower end of the second nut runner 107 to face towards the surface of the diagram, and a frame 109 for supporting the first nut runner 104 and the second nut runner 107.

The operation and problems of the two-nut runner 100 are described with reference to FIG. 11.

Figure 11:
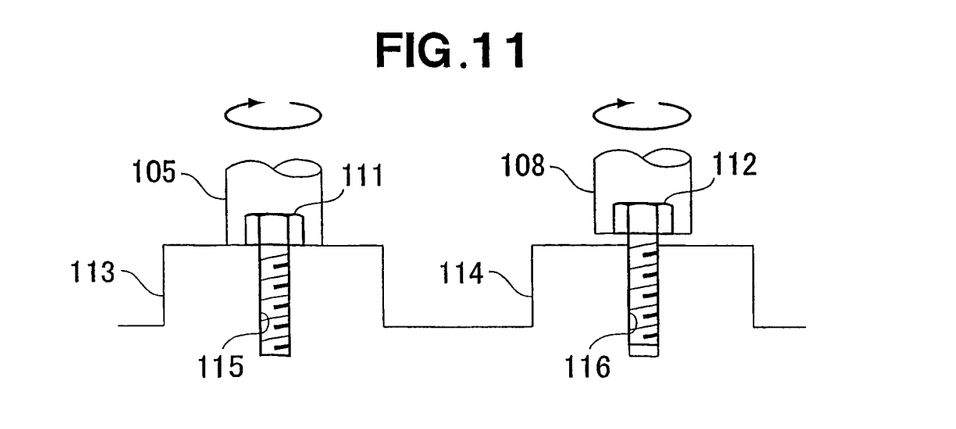
FIG. 11 is a view illustrating an operation and problems of the conventional two-nut runner.

Two bolts 111, 112 can be tightened at the same time by threading a first bolt 111 over a boss 113 with the first socket 105, and threading a second bolt 112 over a boss 114 with the second socket 108, as shown in FIG. 11.

However, differences sometimes arise between the time that the first bolt 111 begins to be threaded into a female screw 115 and the time that the second bolt 112 begins to be threaded into a female screw 116. Tightening of the two bolts 111, 112 then does not finish at the same time. In this example, it is assumed that the first bolt 111 is completely tightened before the second bolt 112.

In FIG. 10, the first socket 105 stops when tightening is complete. The first driven gear 103, the second driven gear 106, and the second socket 108 then also stop because these components are all mechanically linked together.

As a result, the second bolt 112 is not yet finished being tightened. The second bolt 112 must then continue to be tightened. The same applies in cases in which the second bolt 112 finishes being tightened before the first bolt 111, and the first bolt 111 must continue to be tightened. Thus, additional tightening is required, and operating efficiency is reduced.

In view of this, there is a demand for a bolt-tightening tool that can tighten two bolts with equal torque in a single operation.

SUMMARY OF THE INVENTION

According to the present invention, there is provided a bolt-tightening tool that can tighten two bolts by using a single motor as a drive source, the bolt-tightening tool comprising an inner case for accommodating the motor, an outer case for rotatably accommodating the inner case, a first rotating shaft that extends from a motor shaft of the motor and that protrudes from the outer case, a first socket that is provided at the distal end of the first rotating shaft and that fits over the first bolt, a second rotating shaft that is provided on the inner case and whose distal end protrudes from the outer case, and a second socket that is provided at the distal end of the second rotating shaft and that fits over the second bolt.

A structure is employed in which the motor is located between the first rotating shaft and the second rotating shaft. When the first bolt finishes being tightened while the second bolt still has an exposed thread, the second rotating shaft is rotated using the first bolt as a fixation point. The second rotating shaft then tightens the second bolt further. During this time, equal amounts of torque act on the first bolt and second bolt. As a result, it is possible to tighten two bolts with equal amounts of torque in a single operation.

It is preferable that at least one socket selected from the first socket and second socket be provided so as to be capable of moving in the axial direction.

If the distance between the two bolts changes while the bolts are being tightened, the first socket and the second socket can be made to follow this change in distance.

It is preferable that at least one part selected from a first accommodating part for the bolt head provided to the first socket, and a second accommodating part for the bolt head provided to the second socket has a magnet for drawing in a head of the bolt, and a tension member for pulling the magnet into the first accommodating part or the second accommodating part.

The first socket and the second socket can be made to follow changes in the distance between the two bolts that arise when the bolts are being tightened. Providing a magnet inside the socket causes the bolt to be drawn in. The bolt does not fall out of the socket if the bolt is thus drawn in, and therefore there is no need for concern over the bolts coming loose, and the bolts can be tightened in a stable manner.

It is preferable that the inner case be coupled with the outer case, and that the outer case comprise a rotation-locking mechanism for restraining the inner case from rotating.

This bolt-tightening tool can be used as a single bolt-tightening tool because only one rotating shaft is rotated to tighten one bolt.

DETAILED DESCRIPTION

Figure 1:
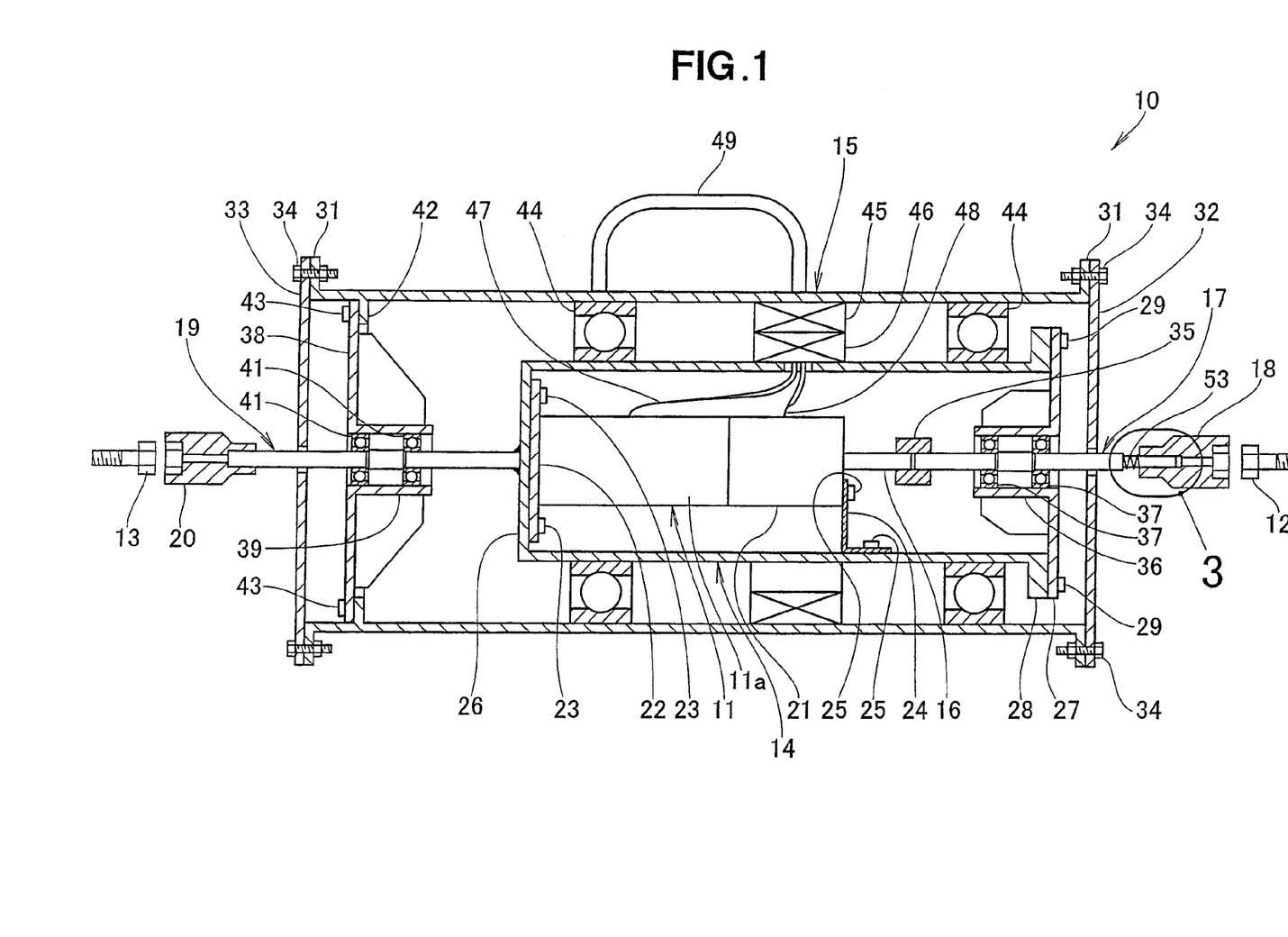
FIG. 1 is a cross-sectional view illustrating a bolt-tightening tool according to the present invention.

As shown in FIG. 1, a bolt-tightening tool 10 is capable of simultaneously rotating a first bolt 12 and a second bolt 13, while using a single motor 11 as a drive source. The bolt-tightening tool 10 is composed of an inner case 14 in which the motor 11 is housed, an outer case 15 in which the inner case 14 is rotatably housed, a first rotating shaft 17 that extends from a motor shaft 16 of the motor 11 and whose distal end protrudes from the outer case 15, a first socket 18 that is provided at the distal end of the first rotating shaft 17 and that fits over the first bolt 12, a second rotating shaft 19 that is provided on the inner case 14 and whose distal end protrudes from the outer case 15, and a second socket 20 that is provided at the distal end of the second rotating shaft 19 and that fits over the second bolt 13.

A torque sensor 21 is provided to the motor 11, and the motor shaft 16 passes through the torque sensor 21. The motor 11 has a flange 22 provided to a motor case 11a, and this flange 22 is fixed in place to the inner case 14 with bolts 23, 23. The torque sensor 21 is fixed in place to the inner case 14 with an L bracket 24 and bolts 25, 25. The motor case 11a is thus fixed in place to the inner case 14.

The inner case 14 is closed at one end, which is a tube, by a bottom lid 26, and is closed at the other end, which is open, by an inner case lid 27. The inner case lid 27 is secured with bolts 29, 29 to a flange 28 provided at the other end of the inner case 14, and can therefore be removed from the inner case 14 by loosening the bolts 29, 29.

The outer case 15 is a larger tube than the inner case 14, and has flanges 31, 31 at both ends. A pair of outer case lids 32, 33 is secured to these flanges 31, 31 with bolts 34, 34.

The first rotating shaft 17 is coupled to the outer case 15 with a shaft coupling 35. The first rotating shaft passes through the inner case lid 27 and the outer case lid 32, and the distal end protrudes from the outer case lid 32. Furthermore, the first rotating shaft 17 is supported via bearings 37, 37 on a boss 36 provided on the inner case lid 27. This support prevents the first rotating shaft 17 from vibrating or bending.

The second rotating shaft 19 is fixed to the bottom lid 26 of the inner case 14, and the distal end of the shaft passes through the outer case lid 33 and protrudes from the outer case lid 33. Furthermore, a boss 39 is provided to an inner lid 38 disposed in parallel with the outer case lid 33 inside the outer case 15, and the second rotating shaft 19 is supported on this boss 39 by means of bearings 41, 41. This support prevents the second rotating shaft 19 from vibrating or bending. The inner lid 38 is secured with bolts 43, 43 to a flange 42 provided inside the outer case 15, and can therefore be removed by loosening the bolts 43, 43.

The inner case 14 is housed in the outer case 15 by means of a pair of bearings 44, 44. An electroconductive ring 45 is provided on the internal surface of the outer case 15, and an electroconductive shoe 46 in contact with this electroconductive ring 45 is provided on the external surface of the inner case 14. An electric supply cable 47 extends between the electroconductive shoe 46 and the motor 11, and a signal cable 48 extends between the electroconductive shoe 46 and the torque sensor 21. Electricity can thereby be supplied to the motor 11 from the outside, and torque signals can be extracted to the outside form the torque sensor 21 even when the outer case 15 is stationary and the inner case 14 is rotating.

Figure 2:
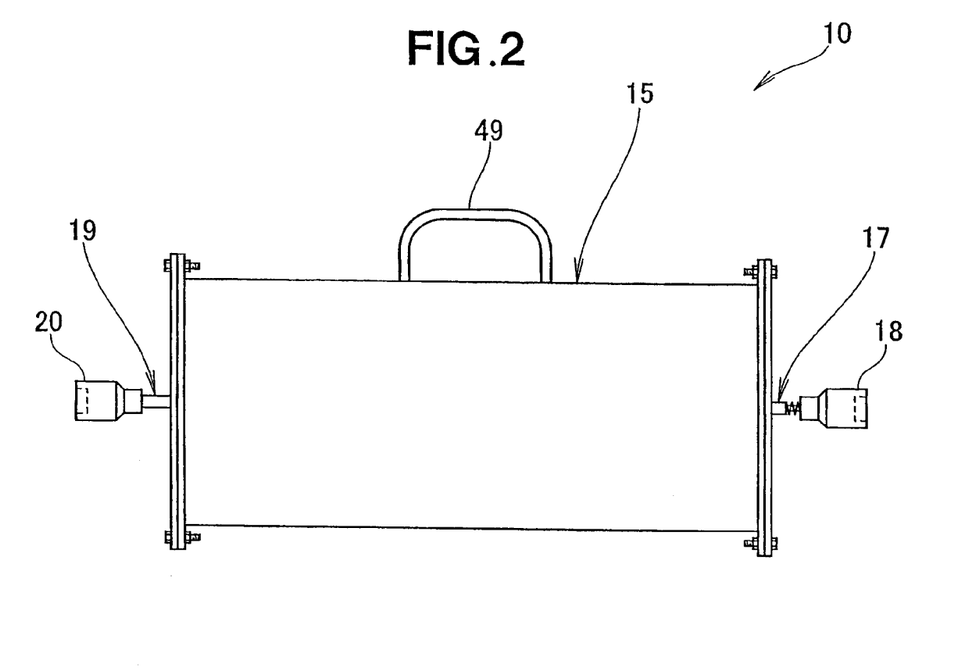
FIG. 2 is a side elevational view of the bolt-tightening tool according to the present invention.

The bolt-tightening tool 10 having the configuration described above is a portable tool that has most components housed in the outer case 15. A user can carry this tool by holding a handle 49 attached to the outer case 15, as shown in FIG. 2.

The details of section 3 in FIG. 1 will now be described with reference to FIG. 3.

Figure 3:
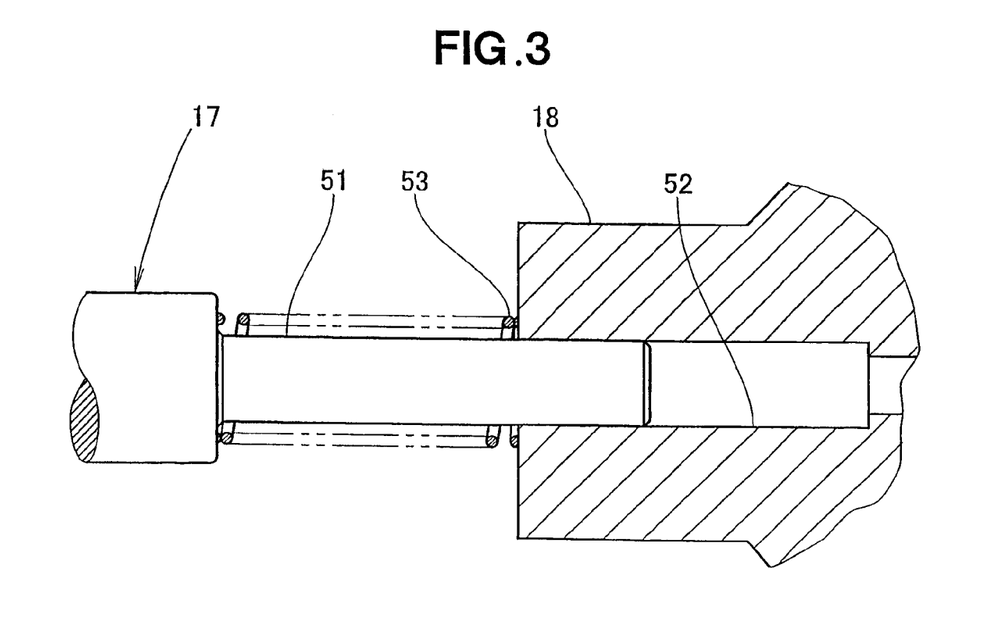
FIG. 3 is an enlarged view of section 3 of FIG. 1.

A shank 51 having either a square or hexagonal cross section is formed at the distal end of the first rotating shaft 17, as shown in FIG. 3. A shank hole 52 in the first socket 18 fits over the shank 51. The first socket 18 is capable of moving to the left and right in the diagram, and is constantly being urged to the right of the diagram by the urging action of a compression coil spring 53 as a compression member, which is located between the first rotating shaft 17 and the first socket 18.

The following is a description of the operation of the bolt-tightening tool 10 having the configuration described above.

Figure 4A:
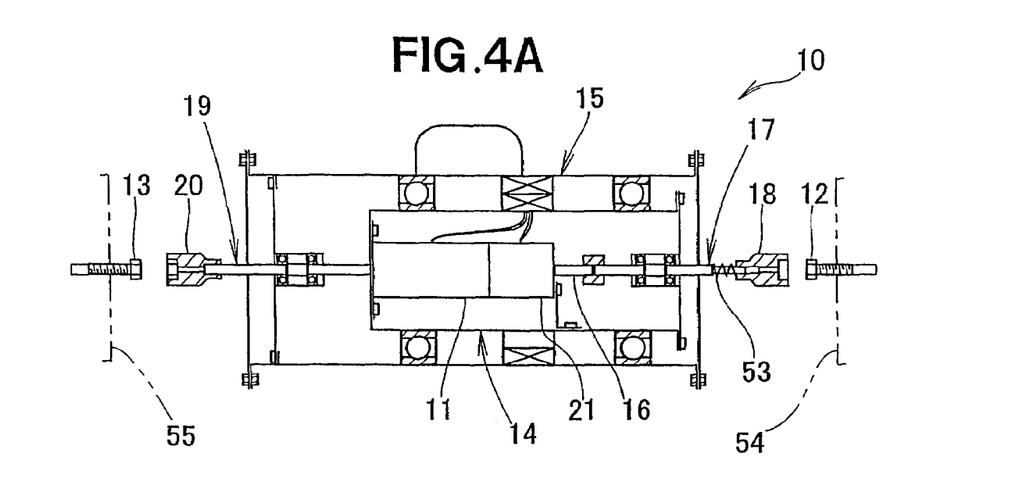
FIGS. 4A through 4C are views illustrating a bolt tightening operation, from setup to the start of tightening.

The first bolt 12 is threaded into a first workpiece 54, and second bolt 13 is threaded into a second workpiece 55, as shown in FIG. 4A. The first socket 18 and second socket 20 are then placed over the heads of the first bolt 12 and second bolt 13.

Figure 4B:
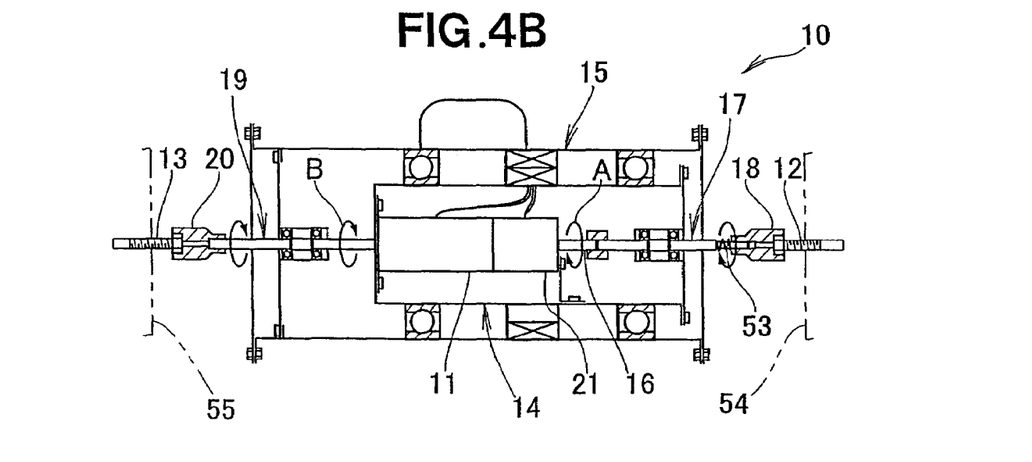

The compression coil spring 53, which reduces the interval between the first workpiece 54 and the second workpiece 55 and is interposed between the first rotating shaft 17 and first socket 18, is in a compressed state, as shown in FIG. 4B. The motor 11 is then started up and the motor shaft 16 rotates in the direction of the arrow A. When the torque generated by this rotation is transmitted to the first socket 18, the first bolt 12 begins to be tightened. At the same time, the motor 11 itself also rotates, whereby the second rotating shaft 19 rotates in the direction of the arrow B. The torque generated by this rotation is transmitted to the second socket 20, whereby the second bolt 13 begins to be tightened.

As the two bolts 12, 13 are tightened, the distance between the two bolts 12, 13 gradually increases. The compression coil spring 53 lengthens because the first socket 18 and the second socket 20 follow this change in the distance between the bolts 12, 13. The lengthening of the spring 53 causes the shank 51 (FIG. 3) provided to the first rotating shaft 17 and the shank hole 52 (FIG. 3) provided to the first socket 18 to slide against each other. The first socket 18 and the second socket 20 thereby follow the two bolts 12, 13.

Figure 4C:
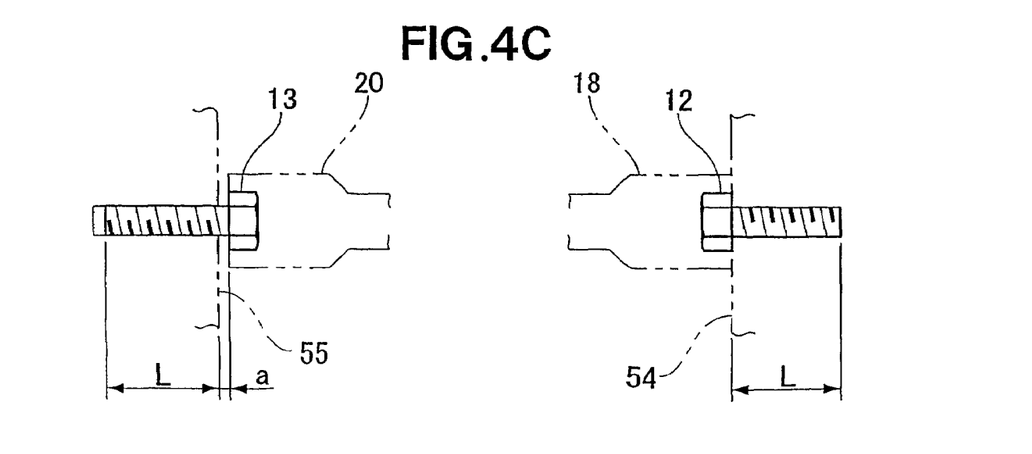

When the first bolt 12 and the second bolt 13 are tightened, lengths L of the first bolt 12 and the second bolt 13 are equal, and the second bolt 12, 13 is longer than the first bolt 12 by a distance of a, as shown in FIG. 4C. If the two bolts 12, 13 are tightened at the same time, the second bolt 13 stops with an exposed thread of a length a remaining when the first bolt 12 finishes being tightened. The second bolt 13 must be tightened further, and the operation of additional tightening is therefore described hereinbelow.

Figure 5A:
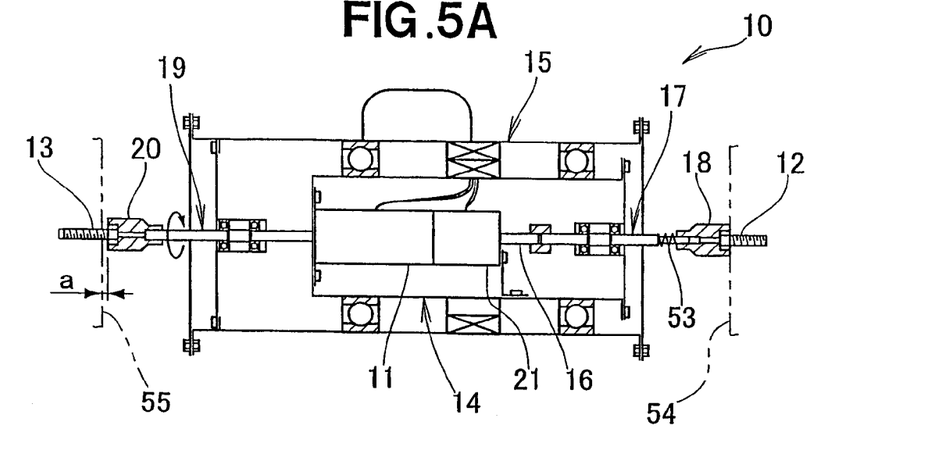
FIGS. 5A through 5C are views illustrating the bolt tightening operation, from additional tightening to completion of tightening.

In FIG. 5A, the first bolt 12 has finished being tightened, but the second bolt 13 still has an exposed thread a. The motor 11 then rotates using the first bolt 12 as a fixation point. The second rotating shaft 19 then rotates, and the second bolt 13 is tightened.

Figure 5B:
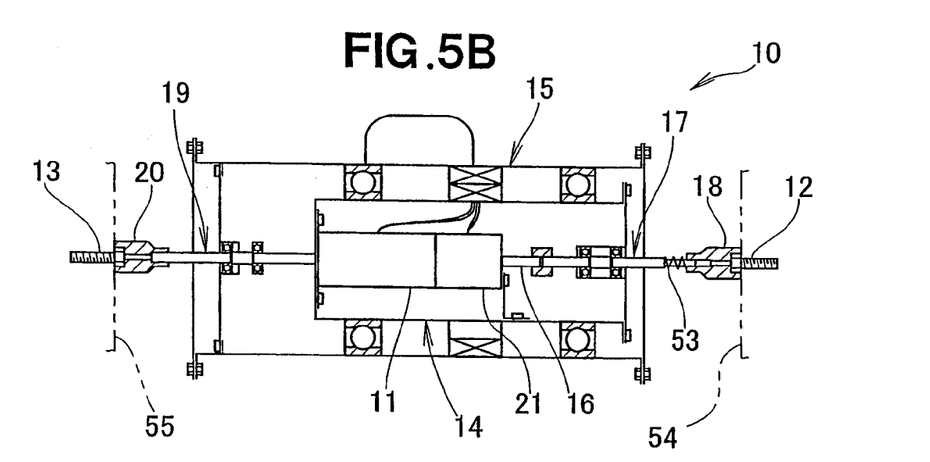
Figure 5C:
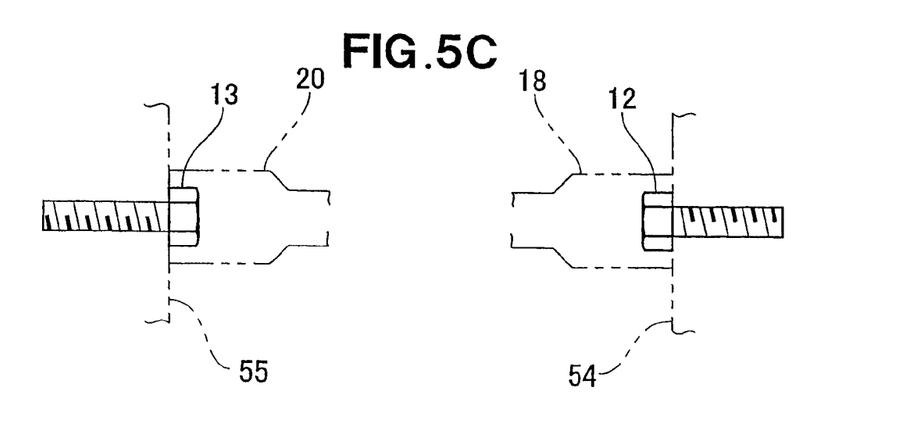

As a result, the second bolt 13 is completely tightened as shown in FIGS. 5B and 5C. Equal amounts of torque act on the first bolt 12 and the second bolt 13 when the bolts are tightened, according to the "law of action and reaction." As a result, the tightening torque of the second bolt 13 is equal to the tightening torque of the first bolt 12.

Thus, the bolt-tightening tool 10 employs a structure in which the motor 11 is located between the first rotating shaft 17 and the second rotating shaft 19. As a result, the two bolts 12, 13 can thereby be tightened with equal amounts of torque in a single operation.

Also, the first socket 18 is configured to be capable of moving in the axial direction. The first socket 18 and the second socket 20 can thereby follow changes in the distance between the two bolts 12, 13 when the bolts 12, 13 are tightened.

In this example, the lengths of the first bolt 12 and second bolt 13 were different for the sake of convenience, but the bolt lengths are not restricted to this option. This is because even if the bolt lengths are equal when the two bolts 12, 13 are tightened, completely tightening one of the bolts allows the other bolt to be tightened further using the first bolt 12 as a fixation point.

A modified structure of the first socket will now be described with reference to FIGS. 6 and 7.

Figure 6:
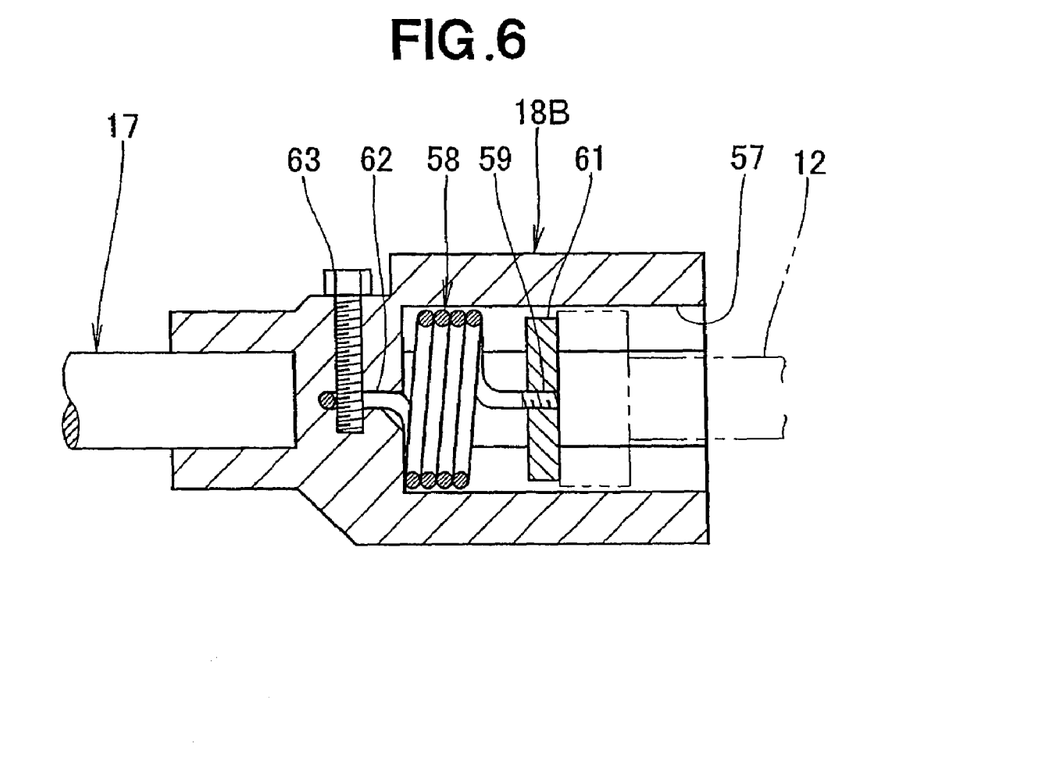
FIG. 6 is a cross-sectional view illustrating a first socket of the tool.
Figure 7:
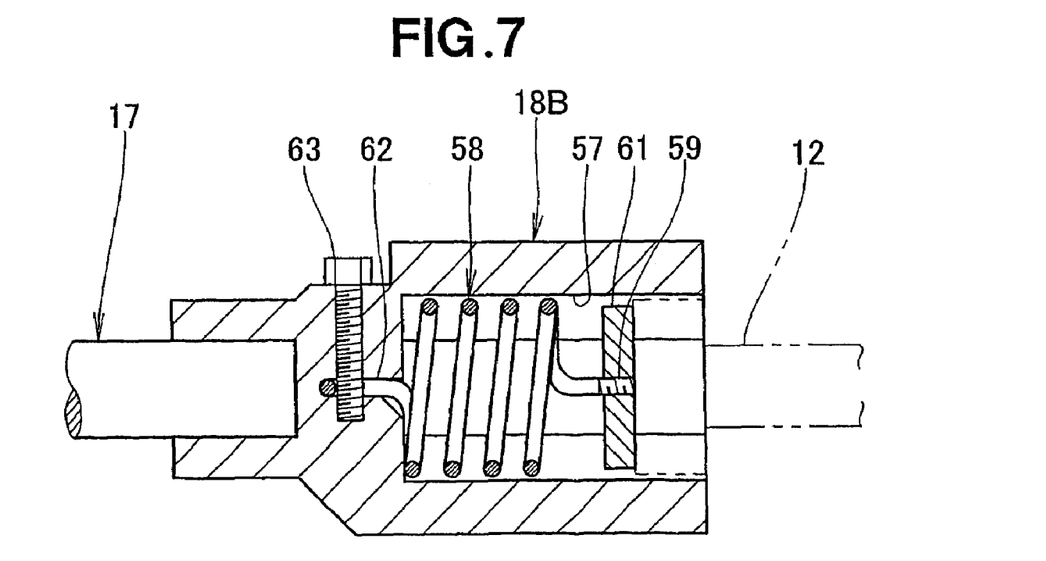
FIG. 7 is a view illustrating an operation of the first socket of FIG. 6.

As shown in FIG. 6, a first socket 18B is provided with an internally disposed first accommodating part 57 for accommodating the head of the first bolt 12 and allowing it to move in the axial direction, an extension coil spring 58 as an extending member formed into a helix provided inside the first accommodating part 57, a screw part 59 provided at one end of the extension coil spring 58, a magnet 61 fixed in place to the screw part 59, a hook 62 provided at the other end of the extension coil spring 58, and a bolt 63 threaded from the external surface of the first socket 18B in order to fix the hook 62 in place.

The moment the bolts 12, 13 begin to be tightened, the first bolt 12 is drawn to the magnet 61 as shown by the imaginary lines when the first bolt 12 is inserted into the first accommodating part 57.

As the bolts 12, 13 continue to be tightened, the first bolt 12 progresses to the right of the diagram. The extension coil spring 58 lengthens and allows the first bolt 12 to move, as shown in FIG. 7.

Consequently, a bolt-tightening tool 10 having the first socket 18B is configured with a first accommodating part 57, an extension coil spring 58, and a magnet 61 provided inside the first socket 18B, wherein the first bolt 12 is drawn into the first accommodating part 57 by the extension coil spring 58 and the magnet 61. Providing the extension coil spring 58 inside the first socket 18B makes it possible for the first socket 18B and the second socket 20 to follow changes in the distance between the bolts 12, 13 when the bolts 12, 13 are tightened.

The first bolt 12 is drawn in as a result of providing the magnet 61 inside the first socket 18B. Bolts can thereby be smoothly tightened because the first bolt 12 does not fall out of the first socket 18B.

If the bolt-tightening tool 10 has a rotation-locking mechanism for restraining one of the rotating shafts from rotating, the result is a single-bolt tightening tool that can tighten one bolt. The rotation-locking mechanism is described with reference to FIG. 8.

Figure 8:
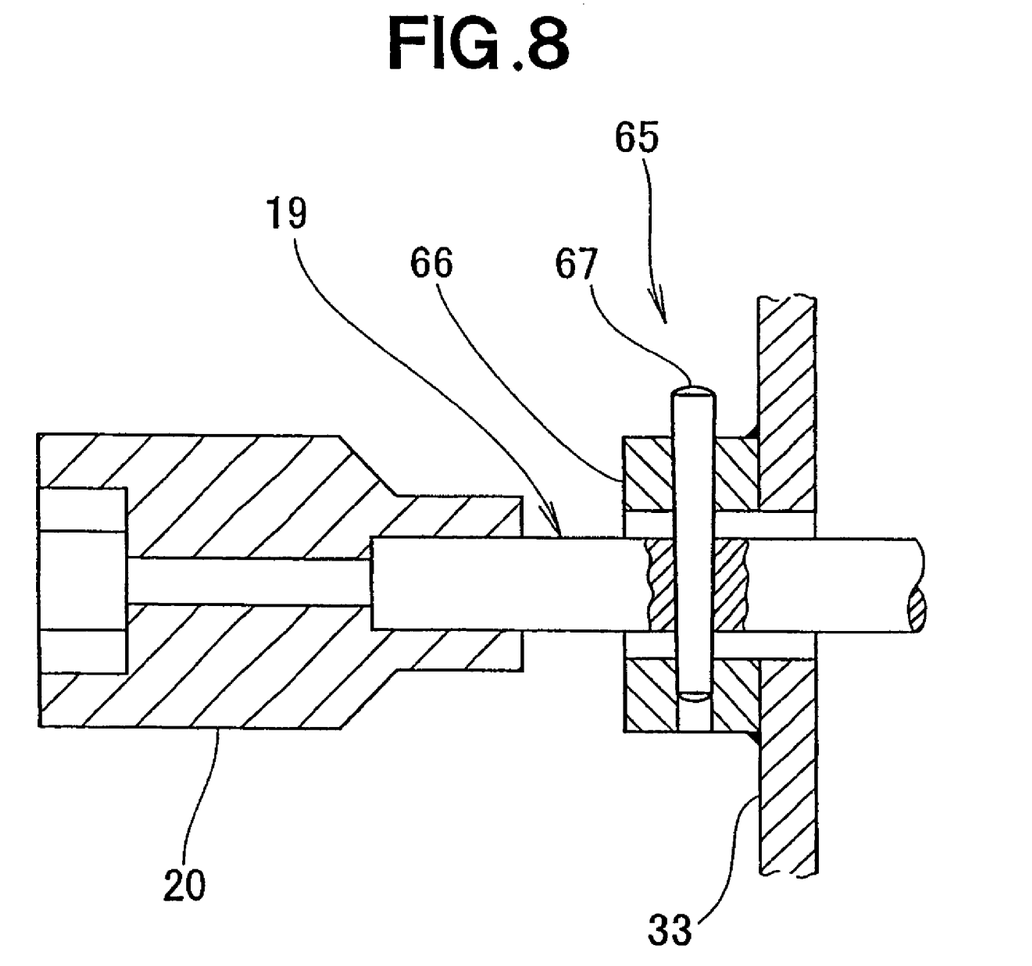
FIG. 8 is a partial cross-sectional view showing a modification of the bolt-tightening tool shown in FIG. 1.

A rotation-locking mechanism 65 enables the second rotating shaft 19 to be coupled with the outer case 15 (FIG. 1) without rotating. This mechanism 65 is configured from a boss 66 provided to the outer case lid 33 and from a pin 67 that passes through this boss 66 and the second rotating shaft 19, for example, as shown in FIG. 8. When the pin 67 is in place, the second rotating shaft 19 is coupled with the outer case lid 33 and is incapable of rotating. In cases in which only one bolt is to be tightened, it is preferable that this state (the state of rendering the second rotating shaft 19 incapable of rotating) be put into effect. If the pin 67 is removed, the second rotating shaft 19 is free to rotate.

Figure 9:
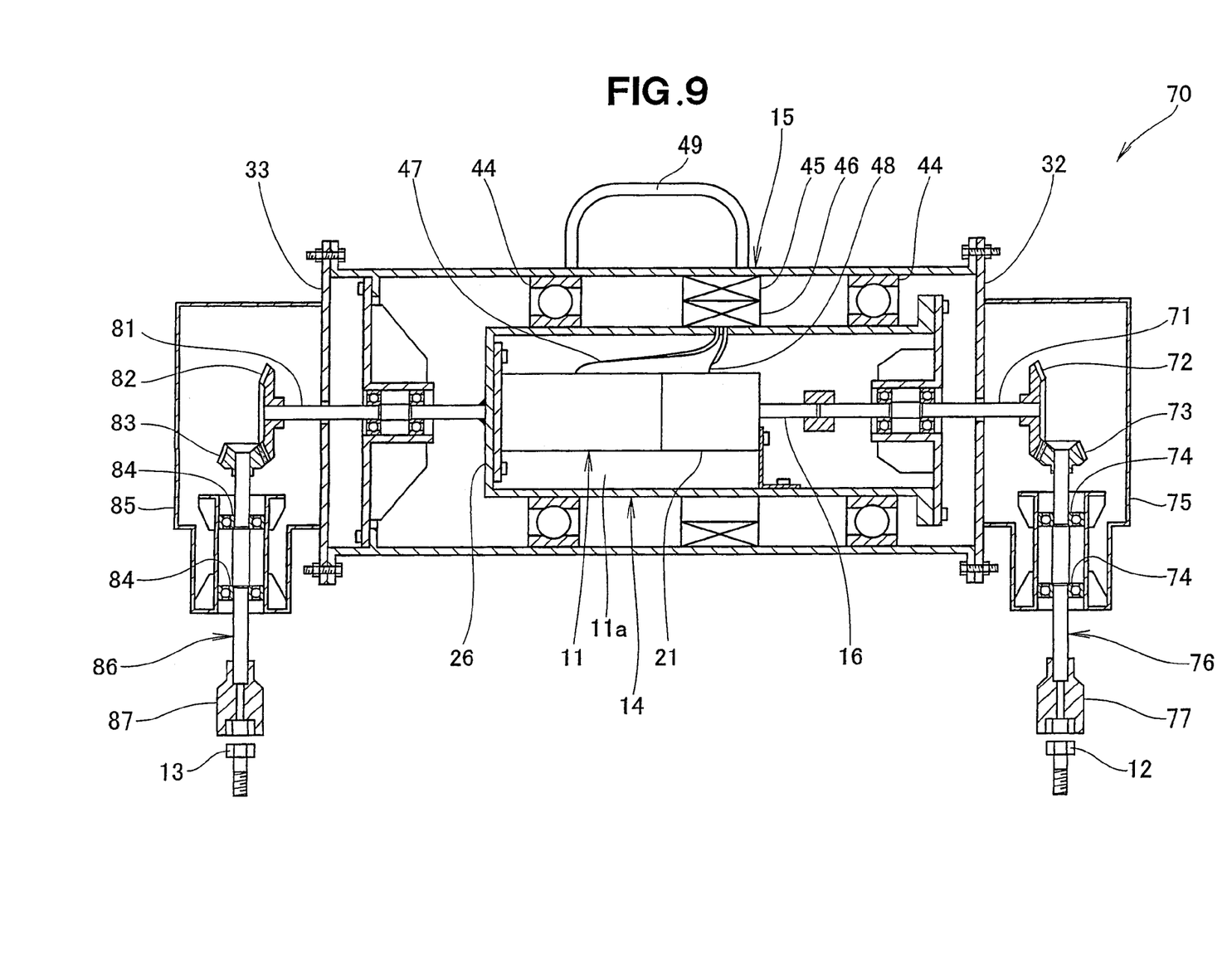
FIG. 9 is a cross-sectional view illustrating a separate bolt-tightening tool according to the present invention.

The bolt-tightening tool 10 described above is a tool for tightening two bolts in opposite directions, but depending on the objective, the tool must be capable of handling bolts that tighten in the same direction. In view of this, the following is a description, made with reference to FIG. 9, of a bolt-tightening tool that can tighten two bolts in the same direction with equal amounts of torque in a single operation. In FIG. 9, components common to FIG. 1 are denoted by the same numerical symbols, and descriptions thereof are omitted. The main difference of FIG. 9 from FIG. 1 is that the two shafts are parallel.

As shown in FIG. 9, a bolt-tightening tool 70 includes a first drive shaft 71 that is provided along the longitudinal axis of the motor shaft 16 and that protrudes from the outer case lid 32, a first drive bevel gear 72 mounted at the distal end of the first drive shaft 71, and a first driven bevel gear 73 meshed with the first drive bevel gear 72. The bolt-tightening tool 70 further includes a first rotating shaft 76 extending from the first driven bevel gear 73, a first socket 77 provided at the distal end of the first rotating shaft 76, a second drive shaft 81 extending from the bottom lid 26 of the inner case 14, a second drive bevel gear 82 mounted at the distal end of the second drive shaft 81, and a second driven bevel gear 83 meshed with the second drive bevel gear 82. The bolt-tightening tool 70 also includes a second rotating shaft 86 extending from the second driven bevel gear 83 so as to be parallel to the first rotating shaft 76, and a second socket 87 provided at the distal end of the second rotating shaft 86. The numerical symbols 74 and 84 denote bearings, and the numerical symbols 75 and 85 denote bearing housing covers.

The first drive bevel gear 72 and the first driven bevel gear 73 constitute a bevel gear train for transmitting torque orthogonally, as do the second drive bevel gear 82 and the second driven bevel gear 83, but a hypoid gear train or worm gears can also be used. The configuration may therefore be altered.

The action of the bolt-tightening tool 70 will now be described.

When the motor 11 is started up, the first drive shaft 71 rotates and the torque generated by this rotation is transmitted to the first rotating shaft 76. The first socket 77 then begins to tighten the first bolt 12. The motor case 11a simultaneously rotates the second drive shaft 81, and the torque generated by this rotation is transmitted to the second rotating shaft 86. The second socket 87 then begins to tighten the second bolt 13.

When the two bolts 12, 13 are tightened and the first bolt 12 finishes being tightened while the second bolt 13 still has an exposed thread, the second rotating shaft 86 is rotated to tighten the second bolt 13 while using the first bolt 12 as a fixation point. Conversely, when the second bolt 13 finishes being tightened while the first bolt 12 still has an exposed thread, the first rotating shaft 76 is rotated to tighten the first bolt 12 while using the second bolt 13 as a fixation point.

Consequently, setting the first rotating shaft 76 and the second rotating shaft 86 parallel to each other makes it possible for the bolt-tightening tool 70 to tighten two bolts in the same tightening direction with equal amounts of torque, in a single operation.

The motor used in the present invention can be an electric motor, a hydraulic motor, or a pneumatic motor. The specific type is not limited.

The objects that are to be tightened in the present invention are preferably bolts, but they may also be nuts instead of bolts.

INDUSTRIAL APPLICABILITY

The present invention is effective as a bolt-tightening tool for tightening two bolts at the same time.

The invention claimed is:

1. A bolt-tightening tool adapted to simultaneously tighten two bolts, comprising:
    an inner case;
    an outer case that includes bearings, wherein said bearings allow the inner case to be rotatably received within the outer case;
    a motor with an output shaft, said motor being fixed to and within the inner case;

a first rotating shaft extending from the output shaft of the motor and protruding from the outer case;

a first socket provided at a distal end of the first rotating shaft and designed to be fitted over a first bolt;

a second rotating shaft affixed to and extending from the inner case and having a distal end protruding from the outer case; and a second socket provided at the distal end of the second rotating shaft and designed to be fitted over a second bolt.

2. The bolt-tightening tool of claim 1, wherein a compression coil spring is located between the first rotating shaft and the first socket to bias the first socket away from the outer case.

3. The bolt-tightening tool of claim 1, wherein the first socket has a first accommodating part in a complimentary shape of a first bolt head, the second socket has a second accommodating part in a complimentary shape of a second bolt head, and at least one of the first and second accommodating parts has a magnet for drawing in the bolt head of the respective first or second bolt, and a tension member for pulling the magnet into the first accommodating part or the second accommodating part, respectively.

4. The bolt-tightening tool of claim 1, wherein the inner case is coupled with the outer case, to prevent the inner case from rotating independent of the outer case.

5. A tool for tightening a first and a second bolt, the tool comprising:

an inner case having a first lid and a second lid at opposite ends of the inner case;

a motor with an output shaft, said motor being disposed within the inner case and fixed to an inner surface of the second lid of the inner case;

an outer case that has a first lid and a second lid at opposite ends of the outer case, said first lid of the inner case being disposed between the first lid of the outer case and the motor, and the second lid of the inner case being disposed between the second lid of the outer case and the motor, wherein the outer case includes bearings that allow the inner case to be rotatably and coaxially received within the outer case;

a first rotating shaft that extends from the output shaft of the motor and through the first lid of the inner case and the first lid of the outer case;

a first socket provided at a distal end of the first rotating shaft and adapted to engage the first bolt;

a second rotating shaft fixed to the second lid of the inner case, said second rotating shaft having a distal end that extends through the outer case; and a second socket provided at the distal end of the second rotating shaft and adapted to engage the second bolt.

6. The tool of claim 5, wherein a compression coil spring is located between the first rotating shaft and the first socket to bias the first socket away from the outer case.

7. The tool of claim 5, wherein the first socket has a first accommodating part in a complimentary shape of a head of the first bolt, the second socket has a second accommodating part in a complimentary shape of a head of the second bolt, and at least one of the first and second accommodating parts has a magnet for drawing in the bolt head of the respective first or second bolt, and a tension member for pulling the magnet into the first accommodating part or the second accommodating part, respectively.

8. The tool of claim 5, wherein the inner case is coupled with the outer case to prevent the inner case from rotating independent of the outer case.

* * * * *

UNITED STATES PATENT AND TRADEMARK OFFICE
CERTIFICATE OF CORRECTION

| | |
|---|---|
| PATENT NO. | : 7,628,097 B2 |
| APPLICATION NO. | : 11/912364 |
| DATED | : December 8, 2009 |
| INVENTOR(S) | : Tsuyoshi et al. |

It is certified that error appears in the above-identified patent and that said Letters Patent is hereby corrected as shown below:

Column 7, Line 26, (Claim 4), delete "case," and insert -- case --.

Signed and Sealed this

Thirtieth Day of March, 2010

David J. Kappos
*Director of the United States Patent and Trademark Office*